United States Patent
Kim

(10) Patent No.: US 10,108,568 B2
(45) Date of Patent: Oct. 23, 2018

(54) MASTER CAPABLE OF COMMUNICATING WITH SLAVE AND SYSTEM INCLUDING THE MASTER

(71) Applicant: Samsung Electronics Co., Ltd., Suwon-si, Gyeonggi-do (KR)

(72) Inventor: Moon Gyung Kim, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 147 days.

(21) Appl. No.: 15/067,166

(22) Filed: Mar. 10, 2016

(65) Prior Publication Data
US 2016/0292107 A1    Oct. 6, 2016

(30) Foreign Application Priority Data
Mar. 30, 2015    (KR) ........................ 10-2015-0044528

(51) Int. Cl.
*G06F 13/00* (2006.01)
*G06F 12/00* (2006.01)
*G06F 13/362* (2006.01)
*G06F 13/40* (2006.01)

(52) U.S. Cl.
CPC ........ *G06F 13/362* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 6,092,172 A | 7/2000 | Nishimoto et al. | |
| 6,970,966 B2 | 11/2005 | Gemelli et al. | |
| 7,636,808 B2 | 12/2009 | Akiyama et al. | |
| 2001/0011329 A1* | 8/2001 | Morein | G06F 12/0804 711/135 |
| 2004/0225829 A1* | 11/2004 | Akiyama | G06F 12/0804 711/104 |
| 2008/0288725 A1 | 11/2008 | Moyer et al. | |
| 2011/0107143 A1 | 5/2011 | Nakatsuka | |
| 2011/0179490 A1* | 7/2011 | Jin | G06F 21/552 726/24 |
| 2012/0246410 A1 | 9/2012 | Xu | |

(Continued)

FOREIGN PATENT DOCUMENTS

| | | |
|---|---|---|
| JP | 08016885 | 2/1996 |
| JP | 2001222467 | 8/2001 |
| JP | 2009217310 | 9/2009 |

OTHER PUBLICATIONS

AMBA AXI Protocol v1.0 Specification, ARM Limited, 2003-2004 (108 pages).

*Primary Examiner* — Hyun Nam
(74) *Attorney, Agent, or Firm* — Renaissance IP Law Group LLP

(57) ABSTRACT

A master for transmitting data to a slave via a bus segment by segment is provided. The master includes a finite state machine (FSM) configured to receive and analyze dirty bits for first data segments to be included in a current segment among the data and to output a first selection signal and location information related to the current segment according to an analysis result and a first multiplexer configured to determine whether to output the current segment as a dirty data segment to the bus based on the first selection signal.

16 Claims, 15 Drawing Sheets

(56) References Cited

U.S. PATENT DOCUMENTS

| | | |
|---|---|---|
| 2012/0254541 A1 | 10/2012 | Beckmann et al. |
| 2013/0272052 A1 | 10/2013 | Kim |
| 2014/0149694 A1* | 5/2014 | Lee .......................... G06F 5/12 |
| | | 711/159 |
| 2015/0355958 A1* | 12/2015 | Cain, III ................. G06F 12/00 |
| | | 714/47.3 |

* cited by examiner

MASTER CAPABLE OF COMMUNICATING WITH SLAVE AND SYSTEM INCLUDING THE MASTER

CROSS-REFERENCE TO RELATED APPLICATION

This application claims priority under 35 U.S.C. § 119(a) from Korean Patent Application No. 10-2015-0044528 filed on Mar. 30, 2015, the disclosure of which is hereby incorporated by reference in its entirety.

BACKGROUND

Embodiments relate to a master capable of communicating data with a slave via a bus, and more particularly, to a master for increasing data transmission efficiency by transmitting only data needed to be updated to a slave via a bus when writing data to the slave via the bus and a data processing system including the master.

With the recent trend of compactness, high-performance, multifunction and convergence of digital electronic devices, a system on chip (SoC) in which multiple systems performing different functions are integrated in a single system is commonly used. Shortening time for research and development of SoC design enables faster responses to rapidly changing market demand. For this reason, recycling of a system block, i.e. an intellectual property (IP) block used in conventional design has been increased. Recycling of an IP block is effective in reducing the time for product development and but also in enhancing the reliability of a newly developed SoC.

In addition, selection of a bus system used for communication between IP blocks integrated in one chip may be part of effective design of a SoC. Transmission and reception of data in a bus system may be performed according to a predetermined protocol of the bus system.

Advanced microcontroller bus architecture (AMBA®) of Advanced RISC Machine (ARM), one of representative bus systems used widely, involves various protocols. For instance, AMBA includes an advanced high-performance bus (AHB) which connects high-speed IP blocks, advanced extensible interface (AXI), and an advanced peripheral bus (APB) which connects low-speed IP blocks.

SUMMARY

Some embodiments include a master for transmitting data to a slave via a bus segment by segment. The master includes a finite state machine (FSM) configured to receive and analyze dirty bits for first data segments to be included in a current segment among the data and to output a first selection signal and location information related to the current segment according to an analysis result and a first multiplexer configured to determine whether to output the current segment as a dirty data segment to the bus based on the first selection signal.

A unit of the segment may be a beat defined in an advanced microcontroller bus architecture advanced extensible interface (AMBA® AXI) protocol specification. The location information may indicate a place of the current segment in a sequence of segments related to the data. When the first data segments are transmitted in succession, at least one of the dirty bits may be set dirty.

Alternatively, the location information may indicate a place of each of the first data segments in a sequence of data segments included in the data. When the first data segments are not adjacent to each other, the dirty bits may be all set dirty. When the first data segments are adjacent to each other, at least one of the dirty bits may be set dirty.

The master may further include a processor configured to output the first data segments and the dirty bits. When all of the dirty bits indicate that none of the first data segments stored in a cache accessed by the processor are changed, the FSM may generate the first selection signal for prohibiting generation of the current segment and may not output the location information.

The master may further include a second multiplexer. At this time, the FSM may generate a second selection signal according to the analysis result and the second multiplexer may determine whether to output the dirty bits to the bus based on the second selection signal. The master may further include a processor configured to output the first data segments and the dirty bits. When all of the dirty bits indicate that none of the first data segments stored in a cache accessed by the processor are changed, the FSM may generate the second selection signal for prohibiting output of the dirty bits and may not output the location information.

Other embodiments include a data processing system including a bus, a slave connected to the bus, and a master connected to the bus and configured to transmit data to the slave via the bus segment by segment. The master includes an FSM configured to receive and analyze dirty bits for first data segments to be included in a current segment among the data and to output a first selection signal and location information related to the current segment according to an analysis result and a first multiplexer configured to determine whether to output the current segment as a dirty data segment to the bus based on the first selection signal.

The bus, the slave, and the master may be formed in one semiconductor chip. Alternatively, the slave may be formed in a first semiconductor chip and the master may be formed in a second semiconductor chip. The master may be a central processing unit (CPU), a graphics processing unit (GPU), a display controller, or a camera interface.

BRIEF DESCRIPTION OF THE DRAWINGS

The above and other features and advantages will become more apparent by describing in detail particular embodiments with reference to the attached drawings in which.

DETAILED DESCRIPTION OF THE EMBODIMENTS

Figure 1:
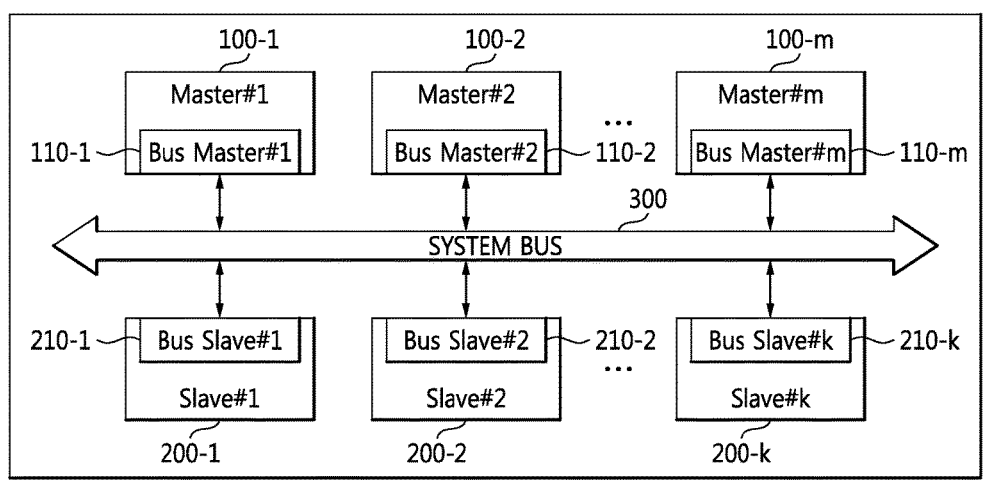
FIG. 1 is a block diagram of a data processing system according to some embodiments.

Embodiments will now be described more fully hereinafter with reference to the accompanying drawings, in which particular embodiments are shown. Embodiments may, however, take many different forms and should not be construed as limited to the particular embodiments set forth herein. Rather, these embodiments are provided so that this disclosure will be thorough and complete, and will fully convey the scope to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 10 according to some embodiments. The data processing system 10 may include multiple masters 100-1 through 100-m, multiple slaves 200-1 through 200-k, and a system bus 300, where "m" and "k" are natural number greater than 1 and may be the same as or different from each other. The data processing system 10 may be implemented in an integrated circuit (IC), a motherboard, a system on chip (SoC), or an application processor, but other embodiments are not restricted to the current embodiments.

Although "m" masters 100-1 through 100-m and "k" slaves 200-1 through 200-k are illustrated in FIG. 1, other embodiments are not restricted to the numbers of masters and slaves. The data processing system 10 may include at least one master and at least one slave.

The data processing system 10 may be included in a personal computer (PC), a mobile computing device, or the like. The mobile computing device may be, for example, a laptop computer, a cellular phone, a smart phone, a tablet PC, a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

Among the masters 100-1 through 100-m, one master (e.g. 100-1) may be configured to transmit data to or receive data from the system bus 300 through a bus master (e.g. 110-1). The data may include a command, a response, and/or data (e.g. write data or read data). One or more of the masters 100-1 through 100-m may be implemented as a central processing unit (CPU), a graphics processing unit (GPU), a display controller, a camera interface, a codec, a video scaler, or an audio digital signal processor (DSP), but other embodiments are not restricted to these examples.

At least one of the masters 100-1 through 100-m may be configured to generate a write request (or a write command) for writing data output from a processor (e.g. 105 in FIG. 2) included therein to a storage device (e.g. 220 in FIG. 2) included in one of the slaves 200-1 through 200-k. The write request may include a write command, an address, the size of write data, and/or information about the order of the write data, but other embodiments are not restricted to these examples.

The masters 100-1 through 100-m and the slaves 200-1 through 200-k may be configured to communicate data with one another via the system bus 300. The system bus 300 may be compatible with advanced extensible interface (AXI), but the type of the system bus 300 is not restricted thereto.

The slaves 200-1 through 200-k may include bus slaves 210-1 through 210-k, respectively. One or more (e.g. 200-1) of the slaves 200-1 through 200-k may be configured to transmit data to or receive data from the system bus 300 via the bus slave (e.g. 210-1). One or more of the bus slaves 210-1 through 210-k may be a memory controller, a universal serial bus (USB) device, or a buffer but is not restricted thereto.

At least one of the slaves 200-1 through 200-k may be configured to write data transmitted via the system bus 300 to the storage device 220 (in FIG. 2) included therein based on a write request transmitted from at least one of the masters 100-1 through 100-m. A master (e.g. 100-1) including a bus master (e.g. 110-1) and a slave (e.g. 200-1) including a bus slave (e.g. 210-1) may be formed together in one semiconductor chip. Alternatively, a master (e.g. 100-1) including a bus master (e.g. 110-1) may be formed in a first chip and a slave (e.g. 200-1) including a bus slave (e.g. 210-1) may be formed in a second chip different from the first chip. Furthermore, a first master (e.g. 100-1) including a bus master (e.g. 110-1) may be formed in a chip and a second master (e.g. 100-2) including a bus master (e.g. 110-2) may be formed in the same chip. Similarly, a first slave (e.g. 200-1) including a bus slave (e.g. 210-1) may be formed in a chip and a second slave (e.g. 200-2) including a bus slave (e.g. 210-2) may be formed in the same chip. That is, masters 100 and slaves 200 may be distributed between one or more chips in a variety of combinations.

Figure 2:
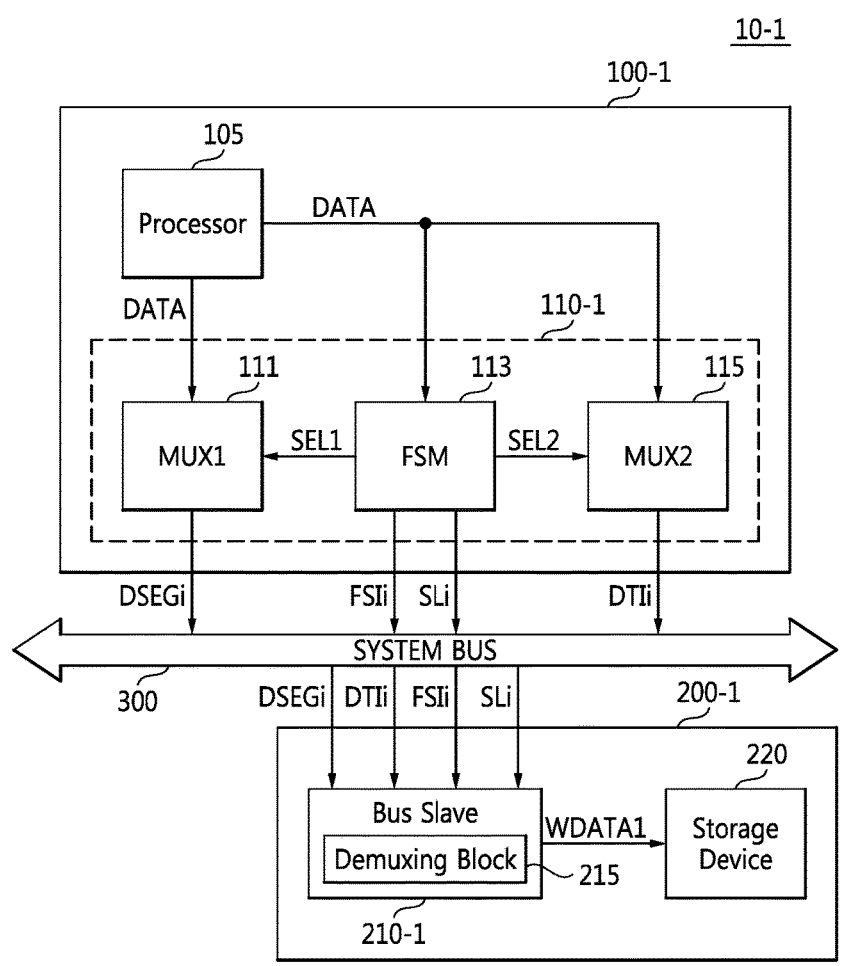
FIG. 2 is a detailed block diagram of a bus, a first master, and a first slave illustrated in FIG. 1 according to some embodiments.

FIG. 2 is a detailed block diagram of the system bus 300, the first master 100-1, and the first slave 200-1 illustrated in FIG. 1 according to some embodiments. Referring to FIGS. 1 and 2, a data processing system 10 may include the first master 100-1, the first slave 200-1, and the system bus 300.

The first master 100-1 may include a processor 105 and the first bus master 110-1. Although the internal structure of the first master 100-1 only is illustrated in FIG. 2, the structure of each of the masters 100-2 through 100-m may be the same as or similar to that of the first master 100-1. However, other embodiments are not restricted to the current embodiments.

The processor 105 may be configured to control the overall operation of the first master 100-1 and transmit data DATA and a write request for the data DATA to the first bus master 110-1. In some embodiments, the processor 105 may be implemented as a single-core or multi-core processor.

The processor 105, which may be configured to access a data cache, may be configured to perform a write transfer via the system bus 300 and the first bus master 110-1 may be configured to transmit a segment (e.g., a beat) needed to be updated in data to be written to the system bus 300. At this time, the first bus master 110-1 may be configured to transmit the segment and location information of the segment to the system bus 300. The location information may refer to a write address or offset for the segment. The data cache may be provided inside or outside the processor 105. The data cache may be an L1 cache, an L2 cache, or the like.

The first master 100-1 may be configured to determine whether a dirty bit is logic 0 or logic 1 and generate a segment (e.g. a beat) including a data segment corresponding to the dirty bit set to logic 1 and an adjacent data segment according to the determination result. When dirty bits of data segments which will be included in a segment (e.g. a beat) are all logic 0, the first master 100-1 does not generate the segment.

Accordingly, the first master 100-1 may not output all data segments included in the data DATA to the system bus 300 but may output data segments only needed to be updated to the system bus 300 in units of segments (e.g. beats). The first master 100-1 may thus function as a compressor by reducing the number of segments (e.g. beats) transmitted to the system bus 300.

The first slave 200-1 may be configured to write the data output from the first master 100-1 correctly to the storage device 220 using data, e.g. segments (or beats), output from the first master 100-1 and location information. Accordingly, the first slave 200-1 may function as a decompressor.

The data DATA may include multiple data segments and at least one dirty bit for each of the data segments. Each of the data segments may be K-bytes, where K is 1 or a natural number greater than 1. A data segment may refer to a group of data bits.

A data cache may include two flag bits per cache block (e.g., cache line). For example, the two flag bits may include a valid bit and a dirty bit. The dirty bit is a flag bit indicating that data stored in the data cache has been changed. The valid bit indicates whether valid data has been loaded to the cache block (e.g., the cache line).

The dirty bit indicates that the processor 105 has written new data to the cache block (i.e., the cache line) but the new data has not been transmitted to a main memory, e.g., the storage device 220. In other words, the dirty bit (or modified bit) may be a flag bit indicating whether data stored in the first slave 200-1 needs to be changed into the data DATA output from the processor 105. When the dirty bit is set to "dirty", the data stored in the first slave 200-1 may be updated with the data DATA output from the processor 105. Here, "being set to dirty" may mean that a dirty bit is set to logic 1; however, in other embodiments, other logic levels may be used to indicate that the dirty bit is set.

The first bus master 110-1 may include a first multiplexer (MUX1) 111, a finite state machine (FSM) 113, and a second multiplexer (MUX2) 115. The MUX1 111 may be configured to receive the data DATA output from the processor 105 and output first data segments selected from among data segments included in the data DATA based on a first selection signal SEL1 output from the FSM 113 to the system bus 300 as dirty data segments DSEGi, where $0 \leq i \leq (N-1)$. A first data segment may be a data segment that corresponds to a dirty bit set to logic 1.

The FSM 113 may be configured to analyze dirty bits included in the data DATA and generate the first selection signal SEL1 for selecting the first data segments (e.g., corresponding to dirty bits set to logic 1) from among the data segments included in the data DATA according to the analysis result. The FSM 113 may also be configured to generate a second selection signal SEL2 for selecting dirty bits for the first data segments among dirty bits included in the data DATA.

The FSM 113 may be configured to analyze location information of each of the first data segments among the data segments and output, to the system bus 300, location information SLi of each of dirty data segments DSEGi corresponding to the location information. The location information SLi may be information (or an identifier) indicating a place of a segment (or a dirty data segment) in a sequence of the dirty data segments DSEGi transmitted to the system bus 300. The FSM 113 may also be configured to output, to the system bus 300, final segment information FSIi indicating whether a current dirty data segment is the last one among the dirty data segments DSEGi transmitted to the system bus 300.

The MUX2 115 may be configured to receive the data DATA from the processor 105 and output, to the system bus 300, dirty bit information DTIi for each of the dirty data segments DSEGi among dirty bits included in the data DATA in response to the second selection signal SEL2 output from the FSM 113.

Consequently, the first bus master 110-1 may be configured to output the dirty data segments DSEGi, the dirty bit information DTIi, the final segment information FSIi, and the location information SLi to the system bus 300. The processor 105 may be configured to control the output timings of the dirty data segments DSEGi, the dirty bit information DTIi, the final segment information FSIi, and the location information SLi. The processor 105 may be configured to control the output timings in accordance with a protocol (e.g. an AXI protocol) of the system bus 300.

The first slave 200-1 may include the first bus slave 210-1 and the storage device 220. Although the first slave 200-1 only is illustrated in FIG. 2, the structure of each of the slaves 200-2 through 200-k may be the same as or similar to that of the first slave 200-1. However, other embodiments are not restricted to the current embodiments.

The first bus slave 210-1 may be configured to receive the dirty data segments DSEGi, the dirty bit information DTIi, the final segment information FSIi, and the location information SLi from the first bus master 110-1 via the system bus 300. The first bus slave 210-1 may include a demultiplexing block (simply referred to as a demuxing block) 215. The first bus slave 210-1 may be configured to analyze the dirty data segments DSEGi, the dirty bit information DTIi, the final segment information FSIi, and the location information SLi using the demuxing block 215 and generate write data WDATA1 to be transmitted (or written) to the storage device 220 according to the analysis result. For example, the demuxing block 215 may include demultiplexers, finite state machines, buffers, or the like that are coupled to the system bus 300 and configured to create the write data WDATA1 and various control signals for the storage device 220 such that the write data WDATA1 is written to the appropriate storage locations. At this time, the write data WDATA1 may include part of the data DATA. The write data WDATA1 may include dirty data segments.

The storage device 220 may be implemented as a memory device, a buffer, or the like. The storage device 220 may be configured to receive the write data WDATA1 from the first bus slave 210-1 and update data stored therein with the write data WDATA1. The storage device 220 may be formed of volatile and/or non-volatile memory.

Figure 3:
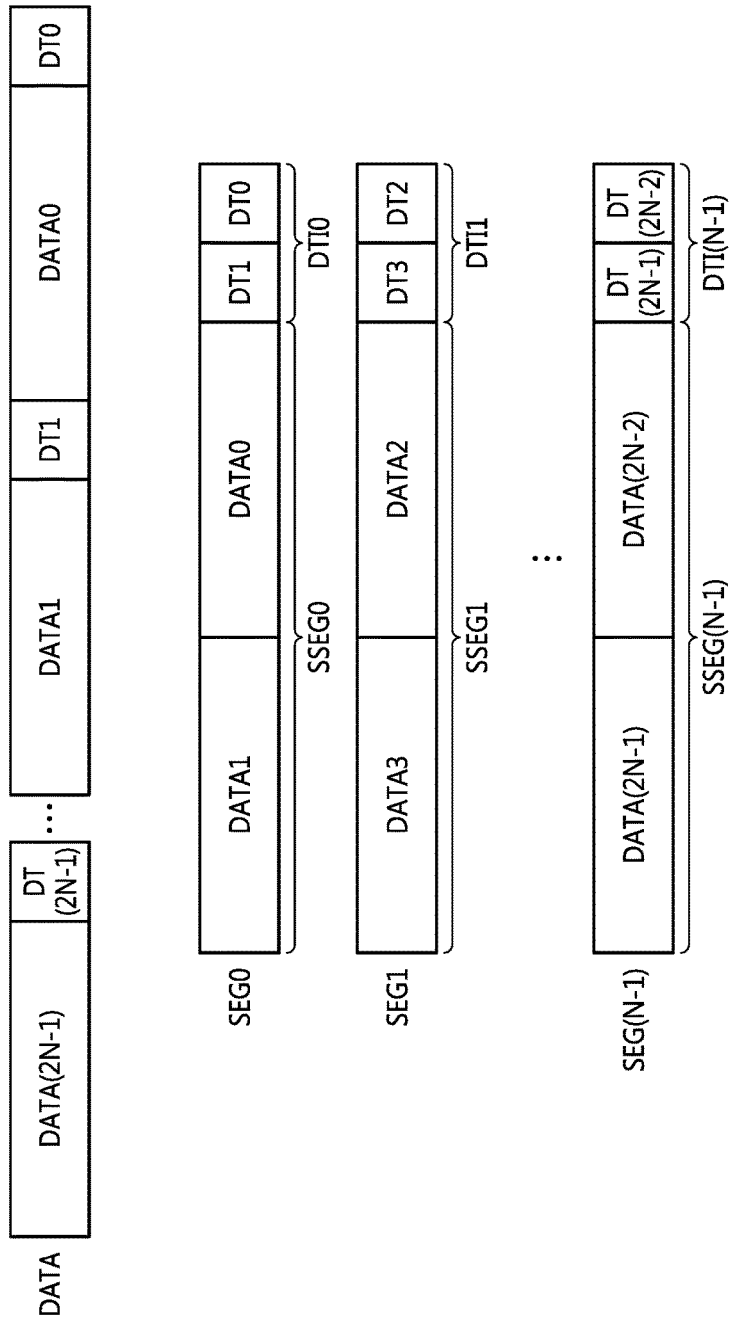
FIG. 3 is a conceptual diagram of a procedure for dividing data into segments according to some embodiments.

FIG. 3 is a conceptual diagram of a procedure for dividing data into segments according to some embodiments. Referring to FIGS. 1 through 3, the data DATA may include multiple data segments DATA0 through DATA(2N−1) and dirty bits DT0 through DT(2N−1) for the respective data segments DATA0 through DATA(2N−1), where N is a natural number. Each of the data segments DATA0 through DATA(2N−1) may include one byte or more.

The data DATA may be divided into multiple segments SEG0 through SEG(N−1). Each of the segments SEG0 through SEG(N−1) may be a beat as defined in the advanced microcontroller bus architecture (AMBA®) AXI protocol. The term "beat" refers to an individual data transfer within an AXI burst. The AMBA® AXI protocol version 1.0 is hereby incorporated by reference.

Each of the bus masters 110-1 through 110-m may be configured to reduce the number of segments (i.e. beats) of data transmitted to the storage device 220 using full cache line eviction even when not a full cache line access for data storing but a partial store access occurs.

The first segment SEG0 may include the first data segment DATA0, the second data segment DATA1, the first dirty bit DT0 for the first data segment DATA0, and the second dirty bit DT1 for the second data segment DATA1. A first data group SSEG0 may include the first data segment DATA0 and the second data segment DATA1 and first dirty bit information DTI0 may include the first dirty bit DT0 and the second dirty bit DT1. The first data segment DATA0 and the second data segment DATA1 may be adjacent to each other or transmitted in succession.

The second segment SEG1 may include the third data segment DATA2, the fourth data segment DATA3, the third dirty bit DT2 for the third data segment DATA2, and the fourth dirty bit DT3 for the fourth data segment DATA3. A second data group SSEG1 may include the third data segment DATA2 and the fourth data segment DATA3 and second dirty bit information DTI1 may include the third dirty bit DT2 and the fourth dirty bit DT3.

The N-th segment SEG(N−1) may include the (2N−1)-th data segment DATA(2N−2), the 2N-th data segment DATA(2N−1), the (2N−1)-th dirty bit DT(2N−2) for the (2N−1)-th data segment DATA(2N−2), and the 2N-th dirty bit DT(2N−1) for the 2N-th data segment DATA(2N−1). An N-th data group SSEG(N−1) may include the (2N−1)-th data segment DATA(2N−2) and the 2N-th data segment DATA(2N−1) and N-th dirty bit information DTI(N−1) may include the (2N−1)-th dirty bit DT(2N−2) and the 2N-th dirty bit DT(2N−1).

Although each of the segments SEG0 through SEG(N−1) includes two data segments in the embodiments illustrated in FIG. 3, the numbers of data segments and dirty bits included in each of the segments SEG0 through SEG(N−1) may be variously changed. The data DATA may be divided into multiple segments according to the control of the processor 105 or the FSM 113.

Figure 4:
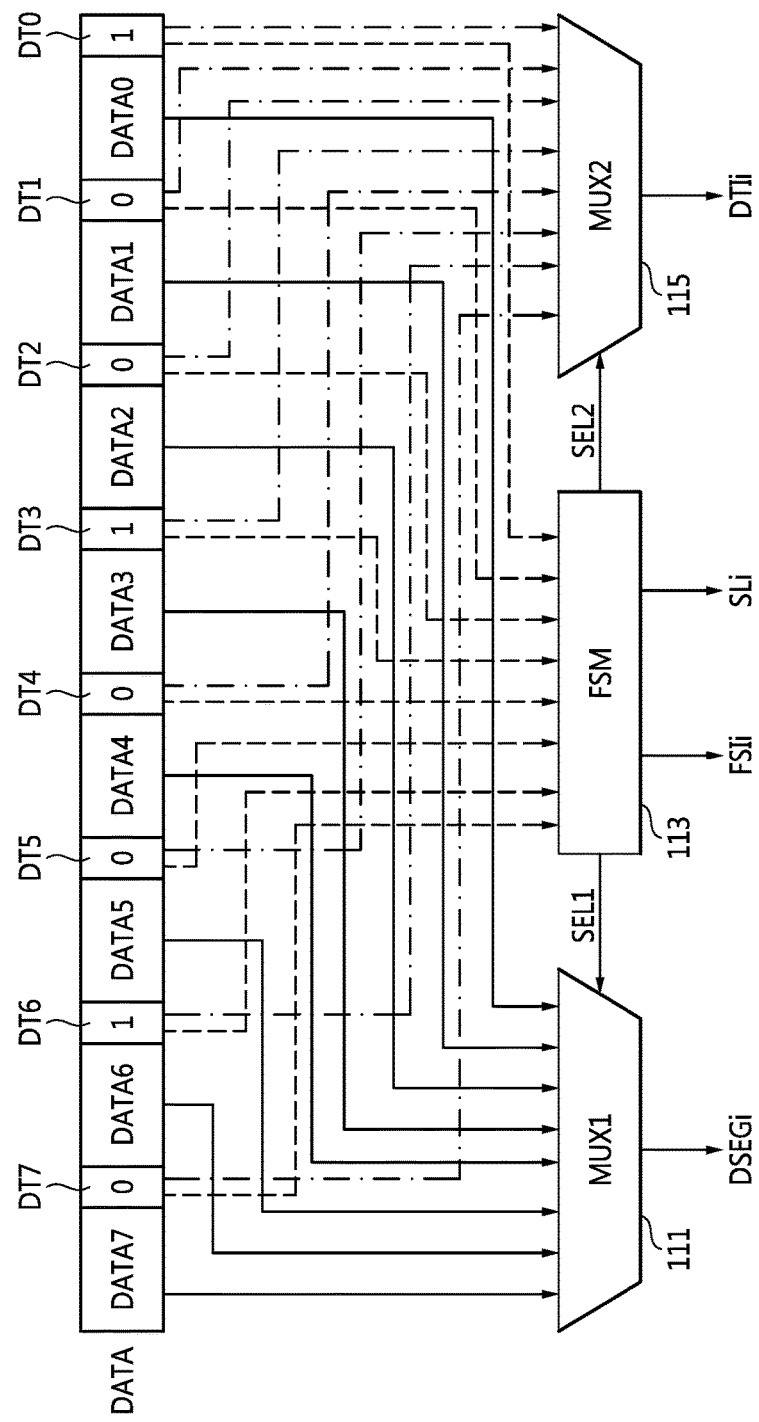
FIG. 4 is a conceptual diagram of a procedure in which data is processed by a first bus master illustrated in FIG. 2 according to some embodiments.
Figure 5:
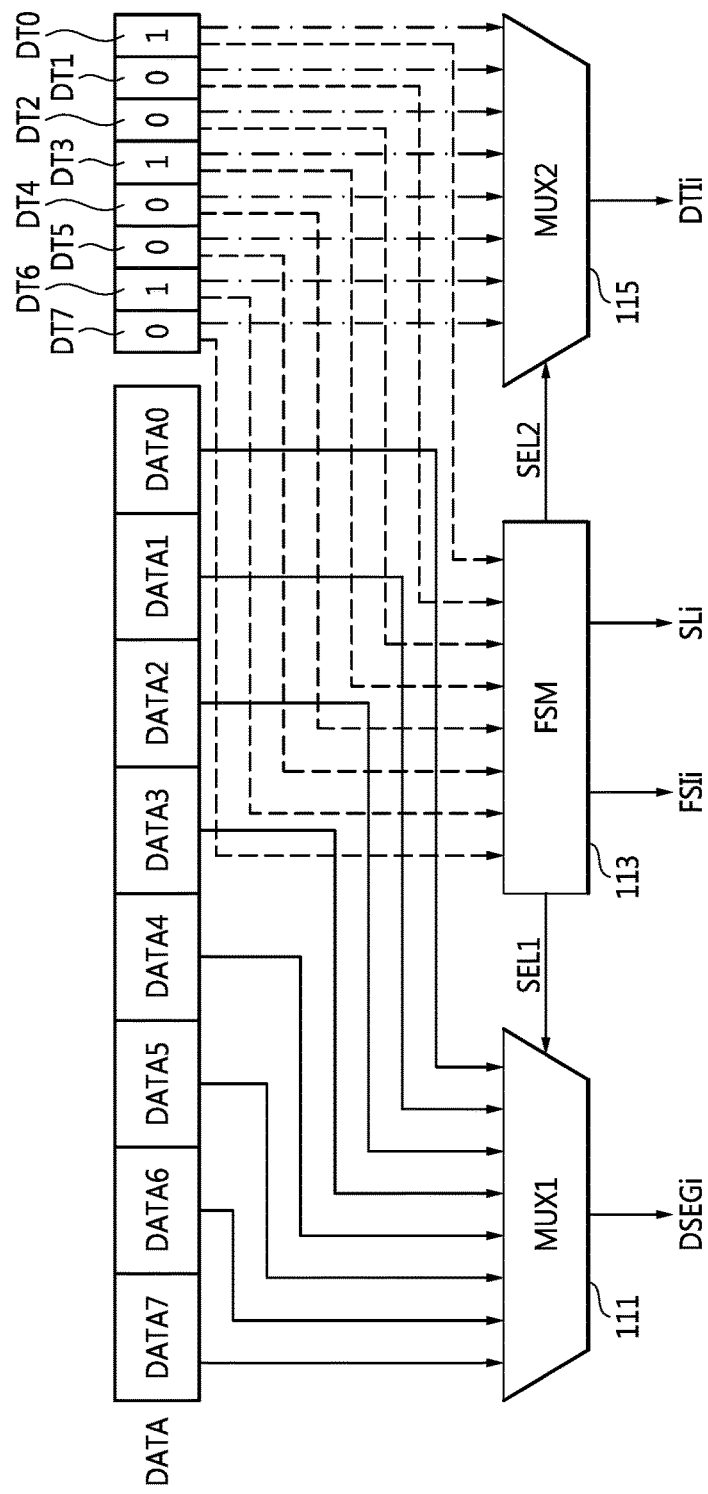
FIG. 5 is a conceptual diagram of a procedure in which data is processed by the first bus master illustrated in FIG. 2 according to other embodiments.

FIG. 4 is a conceptual diagram of a procedure in which the data DATA is processed by the first bus master 110-1 illustrated in FIG. 2 according to some embodiments. FIG. 5 is a conceptual diagram of a procedure in which the data DATA is processed by the first bus master 110-1 illustrated in FIG. 2 according to other embodiments. The dirty bits DT0 through DT7 may be included in the data DATA as show in FIG. 4 or may not be included in the data DATA as shown in FIG. 5.

Referring to FIGS. 1 through 4, the data segments DATA0 through DATA7 and the dirty bits DT0 through DT7 for the respective data segments DATA0 through DATA7 may be alternately arranged. Although the data DATA includes eight data segments DATA0 through DATA7 and eight dirty bits DT0 through DT7 in the embodiments illustrated in FIG. 4, in other embodiments, the number may be different.

Each of the dirty bits DT0 through DT7 may be logic 1 or logic 0. The logic 1 may indicate that the associated data segment is a dirty data segment. Accordingly, data stored in the storage device 220 may be updated with a data segment related to a dirty bit set to logic 1. The MUX1 111 may be configured to output, as the dirty data segments DSEGi, data segments related to dirty bits set to logic 1 among the data segments DATA0 through DATA7 included in the data DATA in response to the first selection signal SEL1 output from the FSM 113.

The FSM 113 may be configured to analyze the dirty bits DT0 through DT7 included in the data DATA and may generate the first selection signal SEL1 and the second selection signal SEL2 according to the analysis result. The FSM 113 may also be configured to output the location information SLi and the final segment information FSIi for each of the dirty data segments DSEGi according to the analysis result.

The MUX2 115 may be configured to output the dirty bit information DTIi for each of the dirty data segments DSEGi among the dirty bits DT0 through DT7 included in the data DATA in response to the second selection signal SEL2 output from the FSM 113.

Referring to FIGS. 1 through 5, the data DATA illustrated in FIG. 5 include only the data segments DATA0 through DATA7 without the dirty bits DT0 through DT7. The dirty bits DT0 through DT7 may be generated by the processor 105 and output to the first bus master 110-1. Apart from the dirty bits DT0 through DT7 being separate from the data segments DATA0 through DATA7, the operations of the elements 111, 113, and 115 illustrated in FIG. 5 are the same as or similar to those of the elements 111, 113, and 115 illustrated in FIG. 4. Therefore, descriptions of the operations of the elements 111, 113, and 115 illustrated in FIG. 5 will be omitted.

Figure 6:
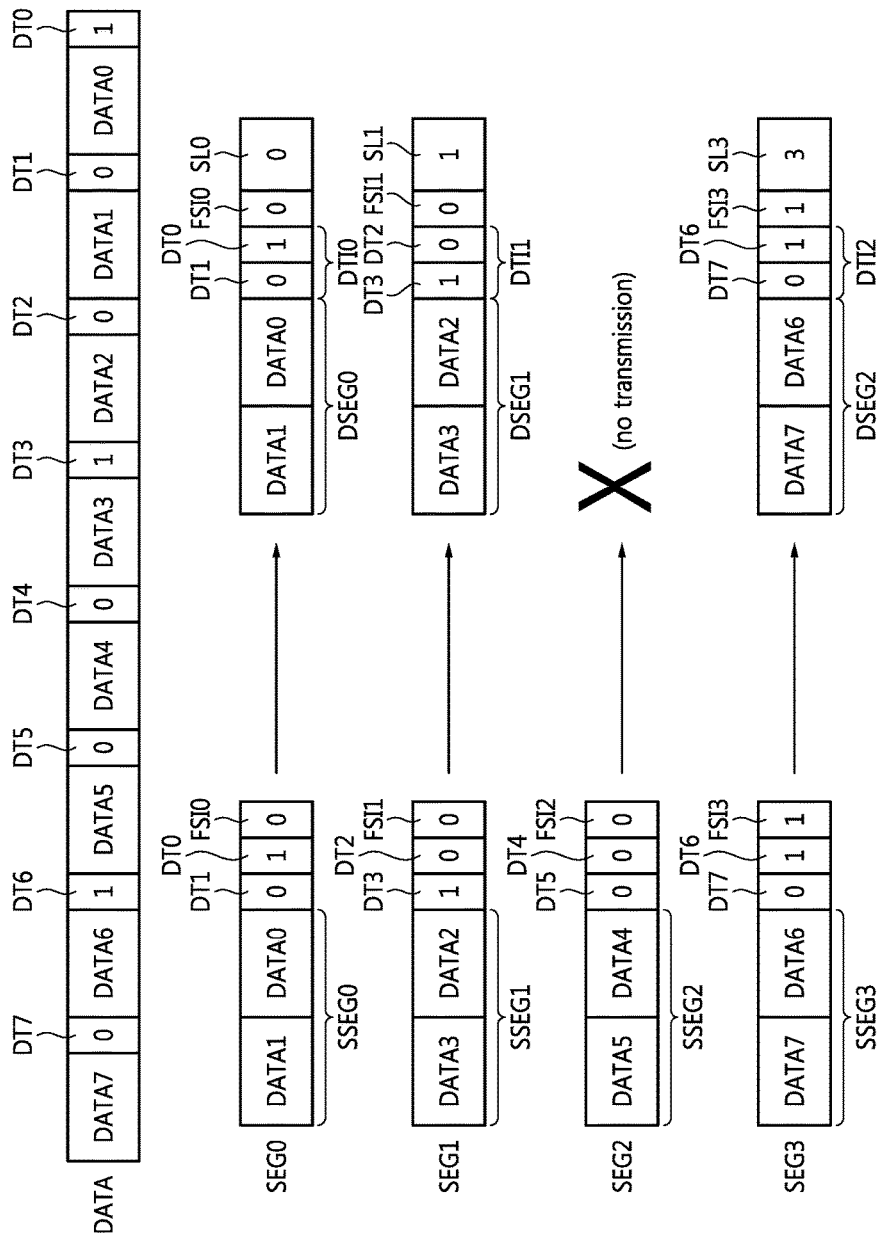
FIG. 6 is a conceptual diagram of a procedure in which the data illustrated in FIG. 4 is processed according to the operation of the first bus master illustrated in FIG. 2.

FIG. 6 is a conceptual diagram of a procedure in which the data DATA illustrated in FIG. 4 is processed according to the operation of the first bus master 110-1 illustrated in FIG. 2. Referring to FIGS. 1 through 6, the data DATA may be divided into multiple the segments SEG0 through SEG3. For this example, it is assumed that each of the segments SEG0 through SEG3 includes two data segments, the first segment SEG0 comes in the zeroth place, the second segment SEG1 comes in the first place, and the fourth segment SEG3 comes in the third place.

The first segment SEG0 may include the first data segment DATA0, the second data segment DATA1, the first dirty bit DT0 (=1), the second dirty bit DT1 (=0), and the final segment information FSI0 (=0). Each of final segment information FSI0 through FSI3 may be set to logic 1 or logic 0. Final segment information set to logic 1 indicates that a current segment is the last one and final segment information set to logic 0 indicates that a current segment is not the last one.

The bus master 110-1 or the FSM 113 may be configured to analyze the dirty bits DT0 through DT7 in pairs of DT0 and DT1, DT2 and DT3, DT4 and DT5, and DT6 and DT7. In detail, the FSM 113 may be configured to analyze the first dirty bit DT0 (=1) for the first data segment DATA0 and the second dirty bit DT1 (=0) for the second data segment DATA1 and may output the first selection signal SEL1 instructing to output the first data segment DATA0 111 and the second data segment DATA1 to the MUX1 and the second selection signal SEL2 instructing to output the first dirty bit DT0 (=1) and the second dirty bit DT1 (=0) to the MUX2 115 according to the analysis result.

Accordingly, the MUX1 111 may be configured to output the first data group SSEG0 including the first data segment DATA0 and the second data segment DATA1 as the first dirty data segment DSEG0. The MUX2 115 may be configured to output the first dirty bit information DTI0 including the first dirty bit DT0 (=1) and the second dirty bit DT1 (=0).

The FSM 113 may also be configured to output the first final segment information FSI0 (=0) indicating that the first data group SSEG0 is not the last one and the first location information SL0 (=0) indicating that the first data group SSEG0, i.e., the first dirty data segment DSEG0 comes in the zeroth place.

The FSM 113 may be configured to analyze the third dirty bit DT2 (=0) for the third data segment DATA2 and the fourth dirty bit DT3 (=1) for the fourth data segment DATA3 and output the first selection signal SEL1 instructing to output the third data segment DATA2 and the fourth data segment DATA3 to the MUX1 111 and the second selection signal SEL2 instructing to output the third dirty bit DT2 (=0) and the fourth dirty bit DT3 (=1) to the MUX2 115 according to the analysis result.

Accordingly, the MUX1 111 may be configured to output the second data group SSEG1 including the third data segment DATA2 and the fourth data segment DATA3 as the second dirty data segment DSEG1. The MUX2 115 may output the second dirty bit information DTI1 including the third dirty bit DT2 (=0) and the fourth dirty bit DT3 (=1).

The FSM 113 may also be configured to output the second final segment information FSI1 (=0) indicating that the second data group SSEG1 is not the last one and the second location information SL1 (=1) indicating that the second data group SSEG1, i.e., the second dirty data segment DSEG1 comes in the first place.

The FSM 113 may be configured to analyze the fifth dirty bit DT4 (=0) for the fifth data segment DATA4 and the sixth dirty bit DT5 (=0) for the sixth data segment DATA5 and output the first selection signal SEL1 instructing to prohibit the transmission of the fifth data segment DATA4 and the sixth data segment DATA5 to the MUX1 111 and the second selection signal SEL2 instructing to prohibit the transmission of the fifth dirty bit DT4 (=0) and the sixth dirty bit DT5 (=0) to the MUX2 115 according to the analysis result.

Accordingly, the MUX1 111 may be configured to not output the third data group SSEG2 including the fifth data segment DATA4 and the sixth data segment DATA5. The MUX2 115 does not output the fifth dirty bit DT4 (=0) and the sixth dirty bit DT5 (=0). In other words, when both dirty bits which have been analyzed are set to logic 0, the fifth data segment DATA4, the sixth data segment DATA5, the fifth dirty bit DT4 (=0), and the sixth dirty bit DT5 (=0) are not output to the system bus 300. In addition, the FSM 113 may be configured to not transmit the third final segment information FSI2 or the third location information SL2.

The FSM 113 may be configured to analyze the seventh dirty bit DT6 (=1) for the seventh data segment DATA6 and the eighth dirty bit DT7 (=0) for the eighth data segment DATA7 and may output the first selection signal SEL1 instructing to output the seventh data segment DATA6 and the eighth data segment DATA7 to the MUX1 111 and the second selection signal SEL2 instructing to output the seventh dirty bit DT6 (=1) and the eighth dirty bit DT7 (=0) to the MUX2 115 according to the analysis result.

Accordingly, the MUX1 111 may be configured to output the fourth data group SSEG3 including the seventh data segment DATA6 and the eighth data segment DATA7 as the third dirty data segment DSEG2. The MUX2 115 may output the fourth dirty bit information DTI3 including the seventh dirty bit DT6 (=1) and the eighth dirty bit DT7 (=0).

The FSM 113 may also be configured to output the fourth final segment information FSI3 (=1) indicating that the fourth data group SSEG3 is the last one and the fourth location information SL3 (=3) indicating that the fourth data group SSEG3, i.e., the third dirty data segment DSEG2 comes in the third place.

As described above, when both dirty bits DT4 and DT5 are logic 0, the data segments DATA4 and DATA5 corresponding to the respective dirty bits DT4 and DT5 are not output by the first bus master 110-1 to the system bus 300. In addition, the first bus master 110-1 does not output the dirty bits DT4, DT5, and third final segment information FSI2 related to the data segments DATA4 and DATA5 to the system bus 300.

Consequently, the first bus master 110-1 may be configured to selectively transmit data segments only needed to be updated among data segments included in the data DATA to the system bus 300, thereby increasing the compression efficiency of data transmitted to the system bus 300. As a result, the bus traffic of the system bus 300 is decreased.

Figure 7:
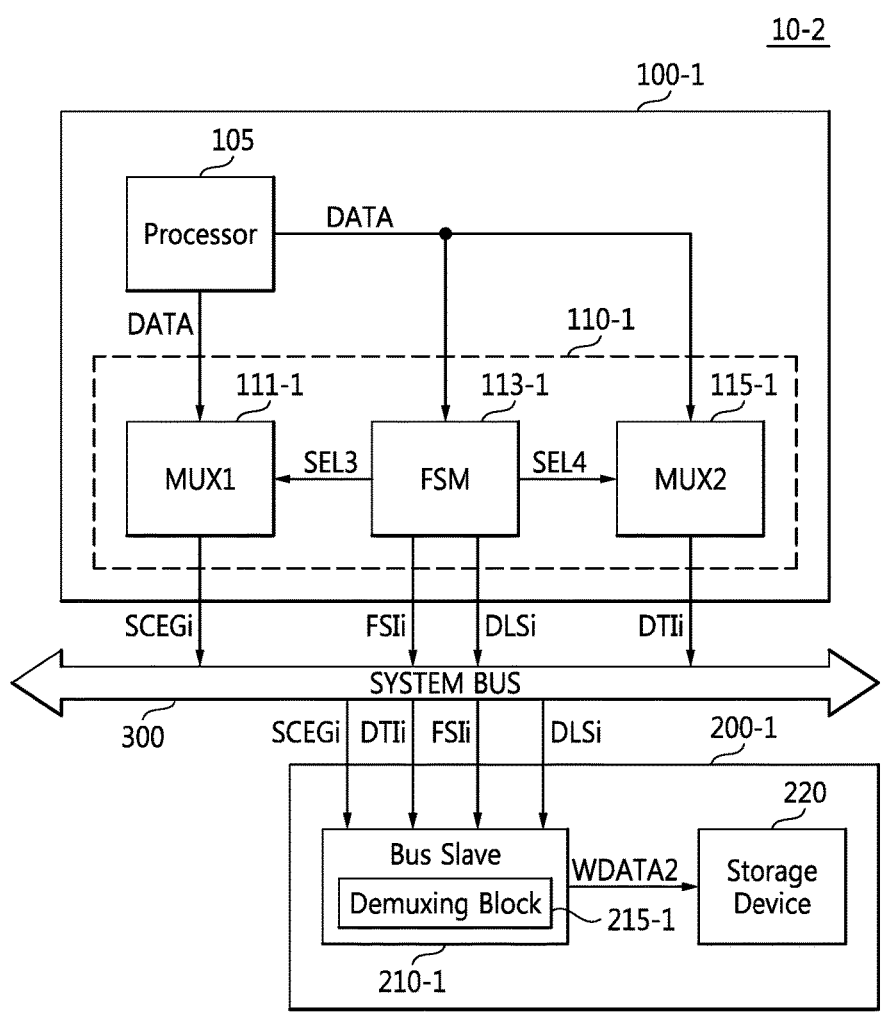
FIG. 7 is a detailed block diagram of the bus, the first master, and the first slave illustrated in FIG. 1 according to other embodiments.
Figure 8:
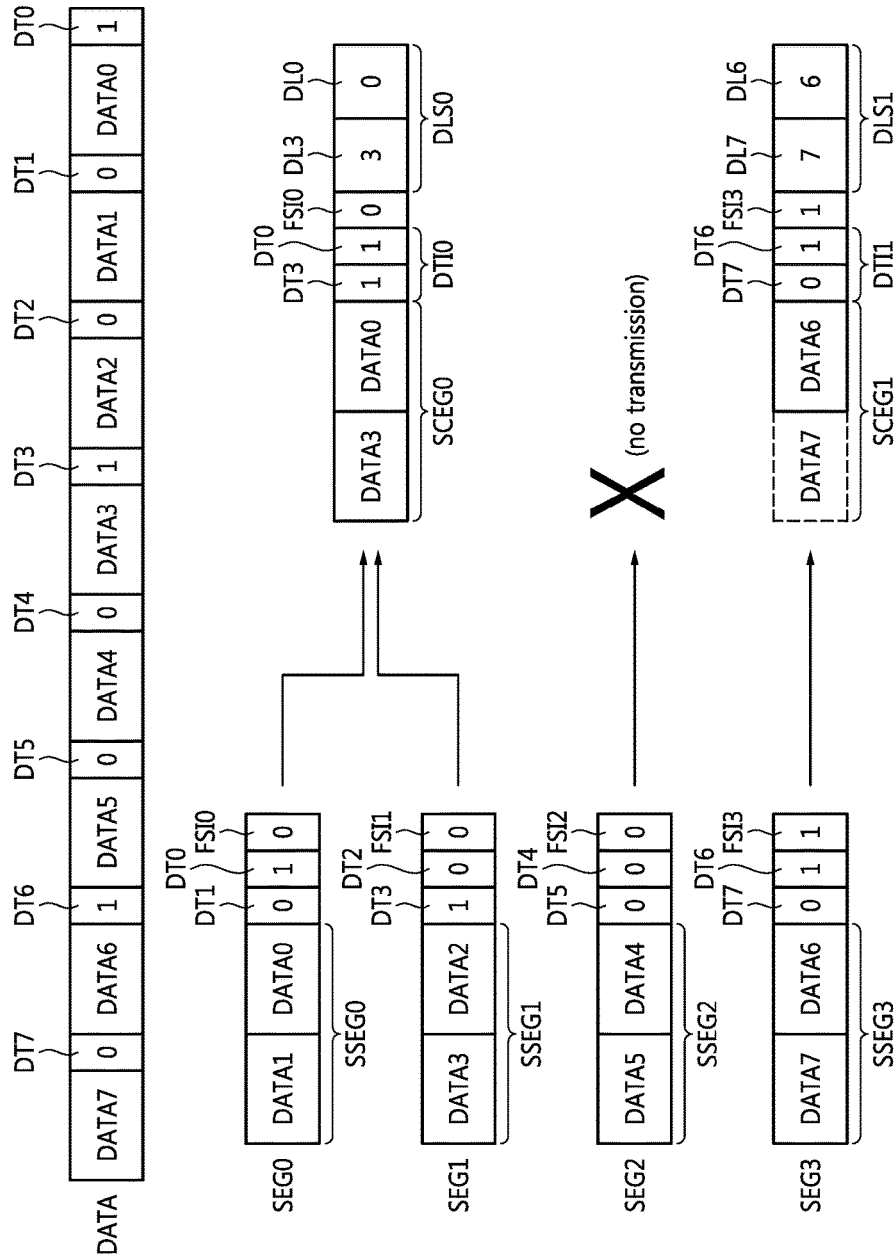
FIG. 8 is a conceptual diagram of a procedure in which the data illustrated in FIG. 4 is processed according to the operation of the first bus master illustrated in FIG. 7.

FIG. 7 is a detailed block diagram of the system bus 300, the first master 100-1, and the first slave 200-1 illustrated in FIG. 1 according to other embodiments. FIG. 8 is a conceptual diagram of a procedure in which the data DATA illustrated in FIG. 4 is processed according to the operation of the first bus master 110-1 illustrated in FIG. 7.

Referring to FIGS. 1 through 7, a data processing system 10-2 may include the first master 100-1, the first slave 200-1, and the system bus 300. Apart from the operation of a MUX1 111-1, which may be configured to output dirty data segments SCEGi to the system bus 300, and an FSM 113-1, which may be configured to output location information DLSi for each of the dirty data segments SCEGi to the system bus 300, the structure and function of the data processing system 10-2 illustrated in FIG. 7 may be substantially the same as or similar to those of the data processing system 10-1 illustrated in FIG. 2. The location information DLSi may indicate a place of a current data segment in a sequence of data segments transmitted to the system bus 300.

The MUX1 111-1 may be configured to receive the data DATA from the processor 105 and output first data segments, which have been selected based on a third selection signal SEL3 output from the FSM 113-1 from among the data segments DATA0 through DATA7 included in the data DATA, to the system bus 300 as the dirty data segments SCEGi.

When the data processing procedure illustrated in FIG. 8 is compared with that illustrated in FIG. 6, a method of selecting the dirty data segments SCEGi from among the data segments DATA0 through DATA7 is different. It is assumed for this example that the first data segment DATA0 comes in the zeroth place, the second data segment DATA1 comes in the first place, the eighth data segment DATA7 comes in the seventh place, and data segments are output in pairs.

Referring to FIGS. 1 through 8, the bus master 110-1 may be configured to analyze the dirty bits DT0 through DT7. The FSM 113-1 may be configured to analyze the first dirty bit DT0 (=1) for the first data segment DATA0 and the second dirty bit DT1 (=0) for the second data segment DATA1 and may generate the third selection signal SEL3 and a fourth selection signal SEL4 according to the analysis result.

The MUX1 111-1 may be configured to output the first data segment DATA0 but does not output the second data segment DATA1 based on the third selection signal SEL3. A MUX2 115-1 may be configured to output the first dirty bit DT0 (=1) but does not output the second dirty bit DT1 (=0) in response to the fourth selection signal SEL4.

The FSM 113-1 may be configured to analyze the third dirty bit DT2 (=0) for the third data segment DATA2 and the fourth dirty bit DT3 (=1) for the fourth data segment DATA3 and generate the third selection signal SEL3 and the fourth selection signal SEL4 according to the analysis result. The MUX1 111-1 does not output the third data segment DATA2 but outputs the fourth data segment DATA3 based on the third selection signal SEL3. The MUX2 115-1 does not output the third dirty bit DT2 (=0) but outputs the fourth dirty bit DT3 (=1) in response to the fourth selection signal SEL4.

The MUX1 111-1 may be configured to output a first data group including the first data segment DATA0 and the fourth data segment DATA3 as a first dirty data segment SCEG0. The MUX2 115-1 may be configured to output the first dirty bit information DTI0 including the first dirty bit DT0 (=1) and the fourth dirty bit DT3 (=1). When the first data segment DATA0 and the fourth data segment DATA3 are not adjacent to each other or are not transmitted in succession, the first dirty bit DT0 (=1) and the fourth dirty bit DT3 (=1) are both set to "dirty". However, in some embodiments, each dirty bit in the first data group may be set to a logic 1 where the data segments are adjacent.

When the first dirty data segment SCEG0 is not the last dirty data segment transmitted to the system bus 300, the FSM 113-1 may be configured to generate and output the first final segment information FSI0 (=0) of logic 0. The FSM 113-1 also may be configured to output first location information DLS0 including location information DL0 (=0) of the first data segment DATA0 and location information DL3 (=3) of the fourth data segment DATA3. In other words, the FSM 113-1 may be configured to output the information DL0 (=0) indicating that the first data segment DATA0 comes in the zeroth place and the information DL3 (=3) indicating that the fourth data segment DATA3 comes in the third place. At this time, the FSM 113-1 may be configured to output the third selection signal SEL3 instructing to output the data segments DATA0 and DATA3 corresponding to the dirty bits DT0 and DT3 and the fourth selection signal SEL4 instructing to output the dirty bits DT0 and DT3 of logic 1.

The FSM 113-1 may be configured to analyze the fifth dirty bit DT4 (=0) for the fifth data segment DATA4 and the sixth dirty bit DT5 (=0) for the sixth data segment DATA5 and generate the third selection signal SEL3 and the fourth selection signal SEL4 according to the analysis result. The MUX1 111-1 does not output either the fifth data segment DATA4 or the sixth data segment DATA5 in response to the third selection signal SEL3. The MUX2 115-1 does not output either the fifth dirty bit DT4 (=0) or the sixth dirty bit DT5 (=0) in response to the fourth selection signal SEL4.

The FSM 113-1 may be configured to analyze the seventh dirty bit DT6 (=1) for the seventh data segment DATA6 and the eighth dirty bit DT7 (=0) for the eighth data segment DATA7 and generate the third selection signal SEL3 and the fourth selection signal SEL4 according to the analysis result. The MUX1 111-1 may be configured to output the seventh data segment DATA6 and may output the eighth data segment DATA7 in response to the third selection signal SEL3. The MUX2 115-1 may be configured to output the seventh dirty bit DT6 (=1) and the eighth dirty bit DT7 (=0) in response to the fourth selection signal SEL4.

When the data DATA is processed in units of segments, that is, two data segments are processed at a time and any of the dirty bits DT6 and DT7 for the respective data segments DATA6 and DATA7 included in the last segment SEG3 is not logic 0, the last segment SEG3 may be output to the system bus 300. In other words, although the eighth dirty bit DT7 for the eighth data segment DATA7 included in the last segment SEG3 is set to logic 0, the FSM 113-1 may be configured to generate the third selection signal SEL3 instructing to output the seventh data segment DATA6 and the eighth data segment DATA7 and the fourth selection signal SEL4 instructing to output the seventh dirty bit DT6 (=1) and the eighth dirty bit DT7 (=0).

Accordingly, the second dirty data segment SCEG1 including the seventh data segment DATA6 and the eighth data segment DATA7 and the second dirty bit information DTI1 including the seventh dirty bit DT6 (=1) and the eighth dirty bit DT7 (=0) are generated. When the seventh data segment DATA6 and the eighth data segment DATA7 are adjacent to each other or transmitted in succession, at least one of the seventh dirty bit DT6 (=1) and the eighth dirty bit DT7 (=0) is set to "dirty".

When the second dirty data segment SCEG1 is the last dirty data segment transmitted to the system bus 300, the FSM 113-1 may be configured to output the fourth final segment information FSI3 (=1) set to logic 1. The FSM 113-1 also may be configured to output second location information DLS1 including location information DL6 (=6) of the seventh data segment DATA6 and location information DL7 (=7) of the eighth data segment DATA7. In other words, the FSM 113-1 may be configured to output the information DL6 (=6) indicating that the seventh data segment DATA6 comes in the sixth place and the information DL7 (=7) indicating that the eighth data segment DATA7 comes in the seventh place.

Consequently, the first bus master 110-1 may be configured to selectively transmit data segments only needed to be updated among data segments included in the data DATA to the system bus 300, thereby increasing the compression efficiency of data transmitted to the system bus 300. As a result, the bus traffic of the system bus 300 may be decreased.

The first bus slave 210-1 may include a demuxing block 215-1. The demuxing block 215-1 may be configured to analyze the dirty data segments SCEGi, the dirty bit information DTIi, the final segment information FSIi, and the location information DLSi and may generate write data WDATA2 to be transmitted or written to the storage device 220 according to the analysis result.

Figure 9:
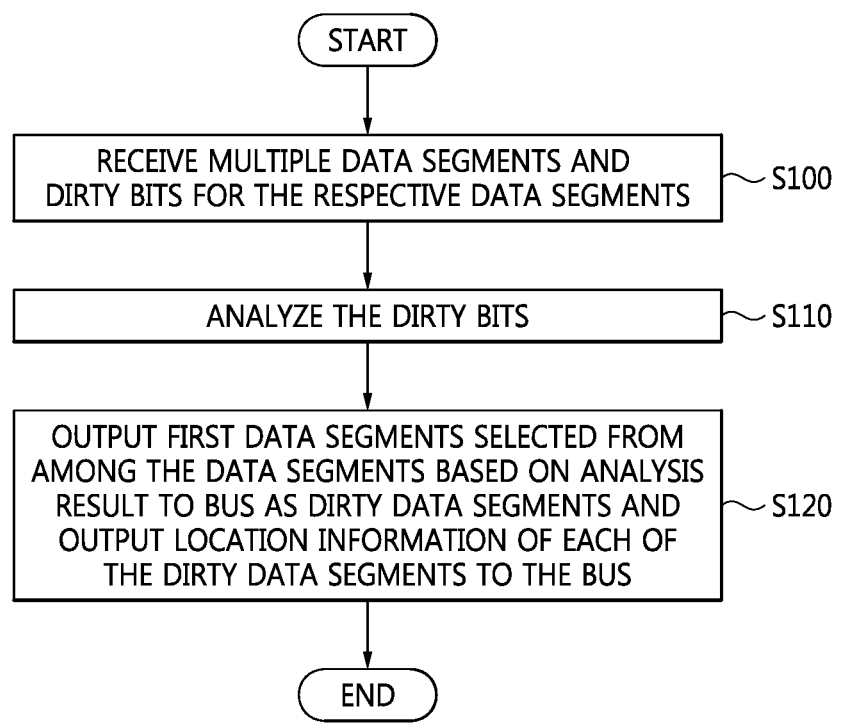
FIG. 9 is a flowchart of a method of operating a first bus master according to some embodiments.

FIG. 9 is a flowchart of a method of operating the first bus master 110-1 according to some embodiments. Referring to FIGS. 1 through 9, the first bus master 110-1 may be configured to receive multiple the data segments DATA0 through DATA(2N−1) and the dirty bits DT0 through DT(2N−1) for the respective data segments DATA0 through DATA(2N−1) in operation S100. The first bus master 110-1 may analyze the dirty bits DT0 through DT(2N−1) in operation S110. In detail, the first bus master 110-1 may analyze whether each dirty bit is set to logic 0 or logic 1, that is, not dirty or dirty.

The first bus master 110-1 may output first data segments selected from among the data segments DATA0 through DATA(2N−1) based on the analysis result to the system bus 300 as the dirty data segments DSEGi or SCEGi and may output the location information SLi or DLSi of the dirty data segments DSEGi or SCEGi to the system bus 300 in operation S120.

Figure 10:
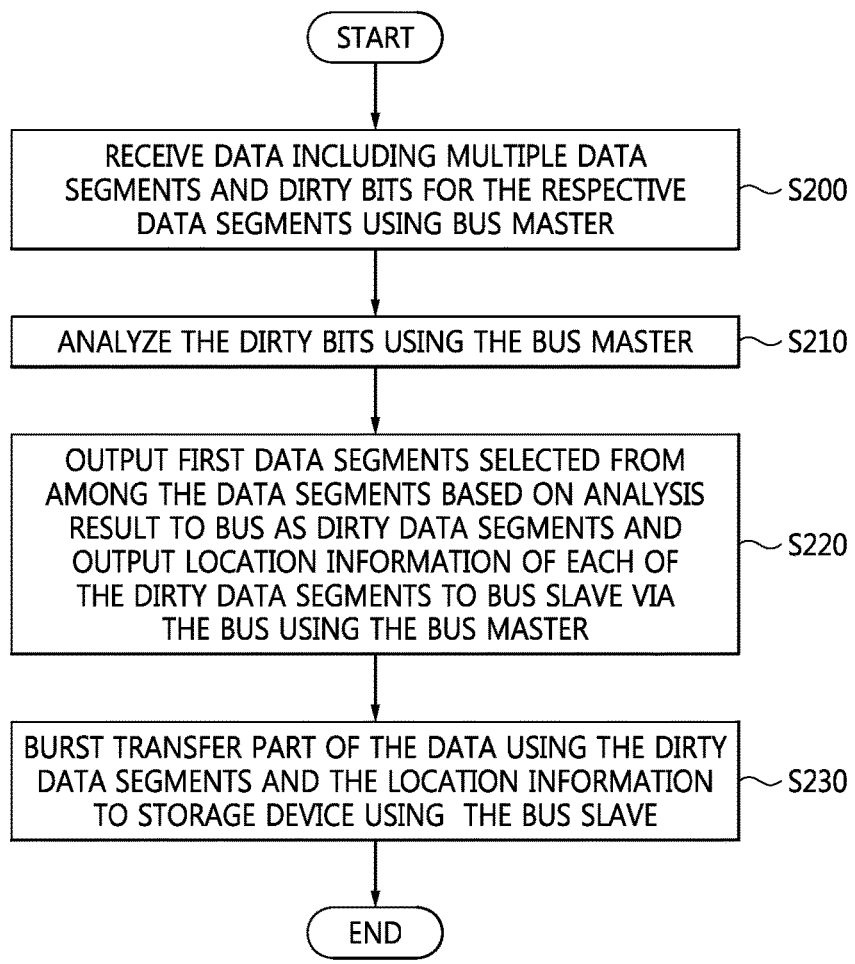
FIG. 10 is a flowchart of a method of operating a data processing system according to some embodiments.

FIG. 10 is a flowchart of a method of operating a data processing system according to some embodiments. Referring to FIGS. 1 through 10, the first bus master 110-1 may receive the data DATA including multiple the data segments DATA0 through DATA(2N−1) and the dirty bits DT0 through DT(2N−1) for the respective data segments DATA0 through DATA(2N−1) in operation S200. The first bus master 110-1 may analyze the dirty bits DT0 through DT(2N−1) in operation S210.

The first bus master 110-1 may output first data segments selected from among the data segments DATA0 through DATA(2N−1) based on the analysis result to the system bus 300 as the dirty data segments DSEGi or SCEGi and may output the location information SLi or DLSi of the dirty data segments DSEGi or SCEGi to the system bus 300 in operation S220.

The first bus slave 210-1 may burst transfer the data WDATA1 or WDATA2 generated using the dirty data segments DSEGi or SCEGi and the location information SLi or DLSi to the storage device 220 in operation S230. The data WDATA1 or WDATA2 may be for an update.

Figure 11:
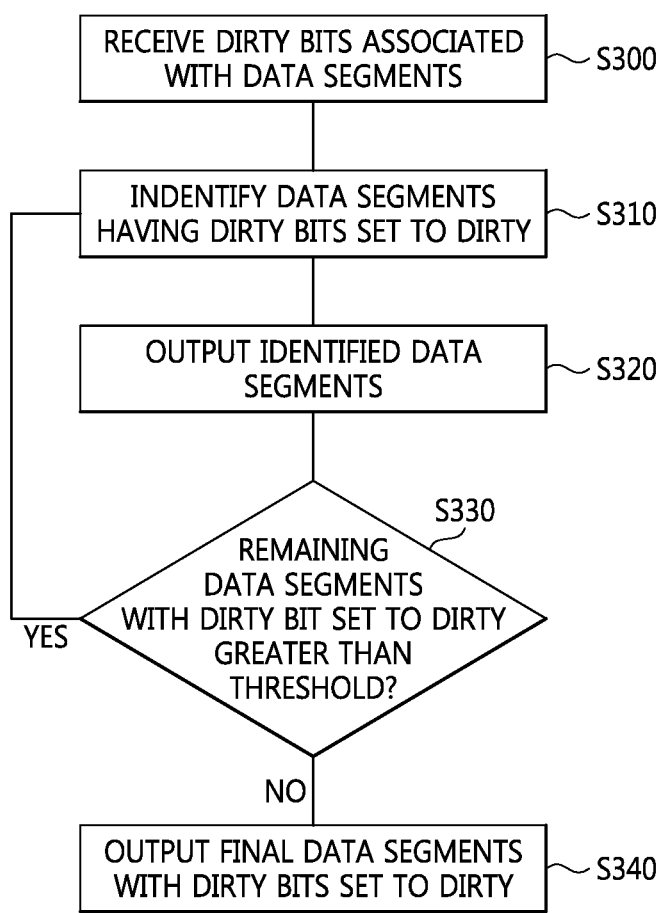
FIG. 11 is a flowchart of a method of operating a data processing system according to some embodiments.

FIG. 11 is a flowchart of a method of operating a data processing system according to some embodiments. Referring to FIGS. 2 and 11, in this embodiment, in S300 dirty bits associated with data segments are received by a FSM 113. The FSM 113 may identify the data segments having dirty bits set to dirty in S310. The identification of these data segments may, but need not be an identification all of the data segments with dirty bits set to dirty. For example, first two data segments with dirty bits set to dirty may be identified. These identified data segments may, but need not be the first data segments of the data segments and may, but need not be adjacent.

In S320, the identified data segments may be output. For example, the FSM 113 may generate a first selection signal SEL1 for the first multiplexer (MUX1) 111. In response, the first multiplexer (MUX1) 111 may output the identified data segments, that is, the data segments identified by the first selection signal SEL1

In S330, it is determined if a number of remaining data segments with dirty bits set to dirty are greater than a threshold. Such a threshold may be, for example, a number of data segments that may be transmitted in parallel over the system bus 300. The FSM 113 may determine that there are data segments with dirty bits set to dirty among the remaining data segments that have not been output. If there are such data segments, more data segments having dirty bits set to dirty may be again identified in S310.

If the remaining data segments have dirty bits set to dirty are less than or equal to the threshold, the final data segments with dirty bits set to dirty may be output to the system bus 300 in S340. As a result, in some embodiments, only data segments with dirty bits set to dirty are output until a final output in S340 where at least one of the data segments that are output have a dirty bit set to dirty.

Figure 12:
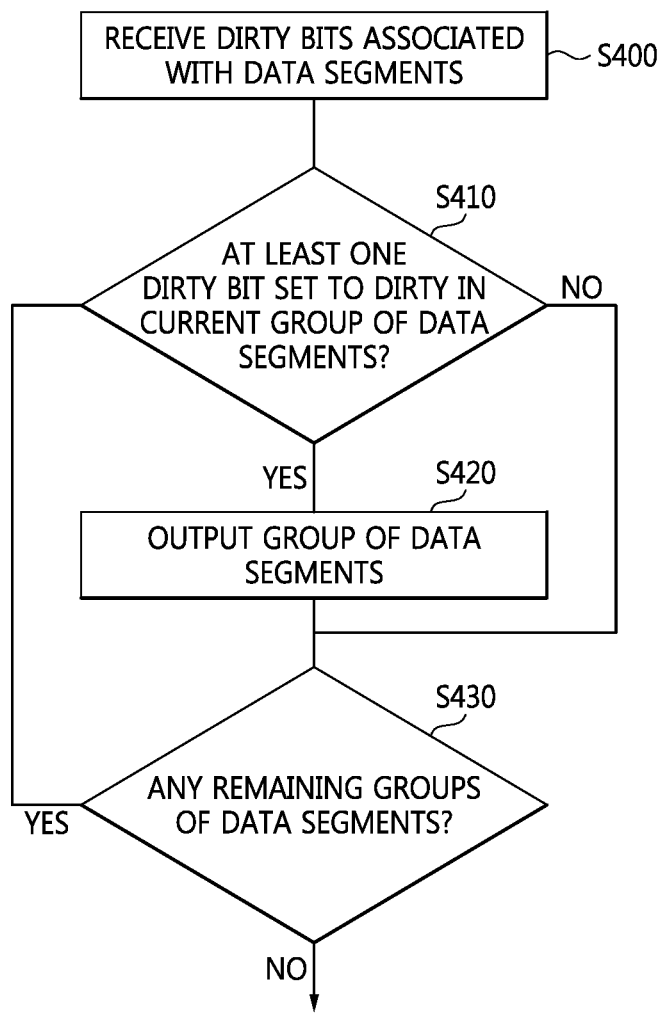
FIG. 12 is a flowchart of a method of operating a data processing system according to some embodiments.

FIG. 12 is a flowchart of a method of operating a data processing system according to some embodiments. Referring to FIGS. 2 and 12, in this embodiment, dirty bits associated with data segments may be received by the FSM 113 in S400. The FSM 113 may determine if at least one dirty bit is set to dirty in a current group of data segments in S410. For example, one to all of the data segments in the current group of data segments may have dirty bits set to dirty. If so, in S420, the group of data segments may be output. For example, the FSM 113 may, using the first selection signal SEL1, cause the first multiplexer (MUX1) 111 to output the data segments of the group.

If no data segment in the group of data segments has a dirty bit set to dirty in S410, processing continues to S430 where the FSM 113 determines whether there are remaining groups of data segments. If so processing continues to S410. If not, further processing may occur.

Accordingly, in some embodiments, all data segments having dirty bits set to dirty are output. However, some data segments that have dirty bits set to not dirty may be output, but only ones in groups of data segments where at least one data segment has a dirty bit set to dirty. In contrast, a group of data segments with no data segment having a dirty bit set to dirty is not output. In particular, none of the data segments of that group are output.

Figure 13:
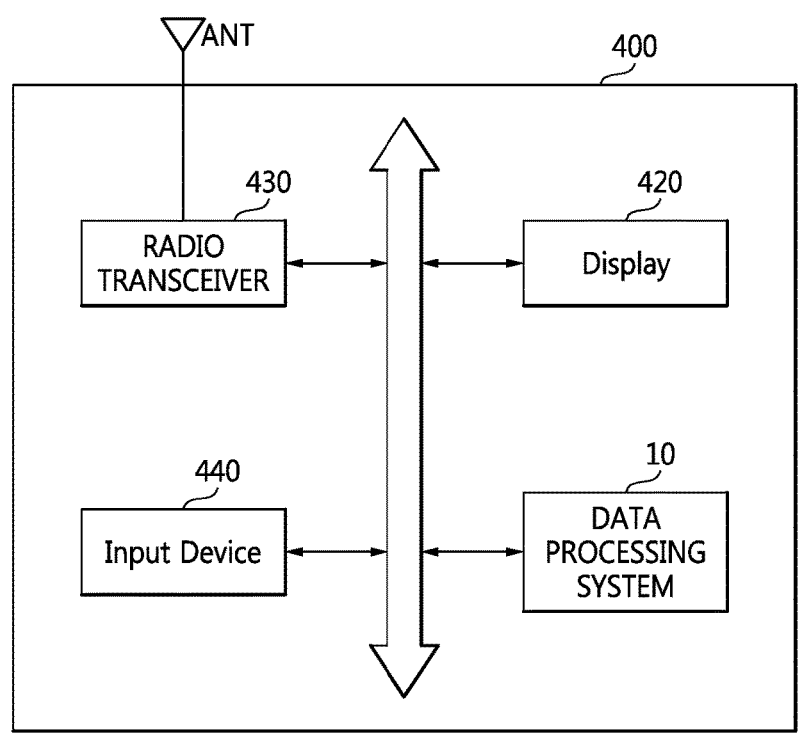
FIG. 13 is a block diagram of a system including a data processing system according to some embodiments.

FIG. 13 is a block diagram of a system 400 including the data processing system 10 according to some embodiments. Referring to FIGS. 1 through 13, the system 400 may be implemented as a mobile computing device. The system 400 may include the data processing system 10, a display 420, a radio transceiver 430, and an input device 440. The data processing system 10 may be formed in a package, which may be mounted on a system board.

The display 420 may be configured to display data output from the storage device 220 according to the control of at least one of the masters 100-1 through 100-m. The radio transceiver 430 may be configured to communicate radio signals with an external device through an antenna ANT. The radio transceiver 430 may be configured to convert radio signal received through the antennal ANT to be able to be processed by at least one of the masters 100-1 through 100-m. The radio transceiver 430 may be configured to convert a signal output from at least one of the masters 100-1 through 100-m into a radio signal and transmit the radio signal to an external device through the antenna ANT.

The input device 440 may be configured to enable a control signal for controlling the operation of at least one of the masters 100-1 through 100-m or data to be processed by at least one of the masters 100-1 through 100-m to be input to the system 400.

Figure 14:
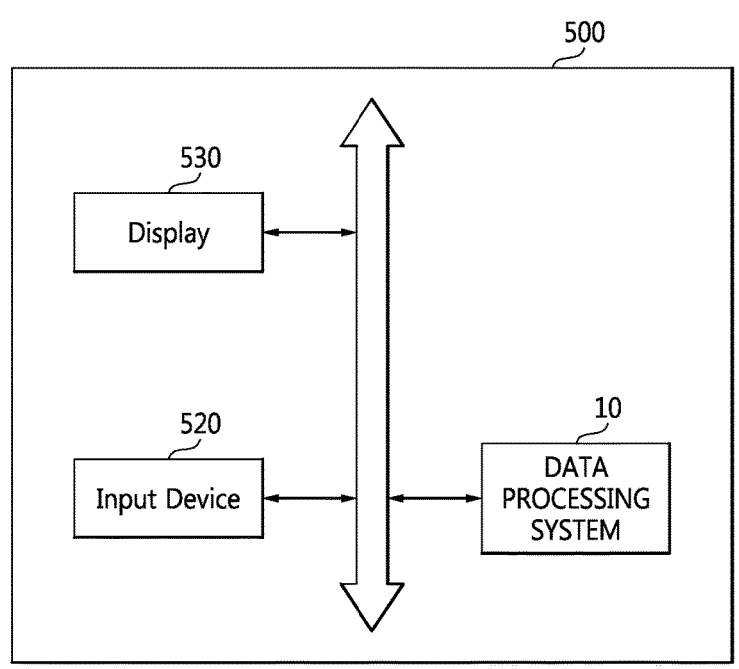
FIG. 14 is a block diagram of a system including a data processing system according to other embodiments.

FIG. 14 is a block diagram of a system 500 including the data processing system 10 according to other embodiments. Referring to FIGS. 1 through 10 and FIG. 14, the system 500 may be implemented, for example, as a PC, a tablet PC, an e-reader, a PDA, a PMP, an MP3 player, or an MP4 player.

The system 500 may include the data processing system 10 configured to control the overall operation of the system 500, an input device 520, and a display 530. The input device 520 may be configured to enable a control signal for controlling the operation of at least one of the masters 100-1 through 100-m or data to be processed by at least one of the masters 100-1 through 100-m to be input to the system 500. The display 530 may be configured to display data stored in the storage device 220 according to the control of at least one of the masters 100-1 through 100-m or an input signal generated by the input device 520.

Figure 15:
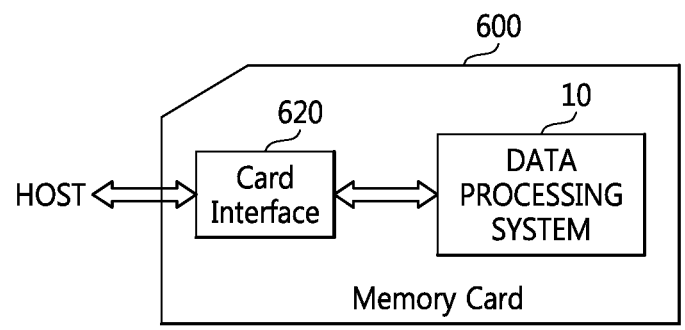
FIG. 15 is a block diagram of a system including a data processing system according to still other embodiments.

FIG. 15 is a block diagram of a system 600 including the data processing system 10 according to still other embodiments. Referring to FIGS. 1 through 10 and FIG. 15, the system 600 may be implemented as a memory card or a smart card. The system 600 may include the data processing system 10 and a card interface 620. The bus slave 210-1 included in the data processing system 10 may be configured to control data exchange between the storage device 220 and the card interface 620.

The card interface 620 may be a secure digital (SD) card interface or a multi-media card (MMC) interface, but other embodiments are not restricted to these examples. The card interface 620 may interface a host and the storage device 220 of the data processing system 10 for data exchange according to a protocol of the host. The system 600 may be connected with the host such as, for example, a computer, a digital camera, a digital audio player, a cellular phone, console video game hardware, or a digital set-top box.

Figure 16:
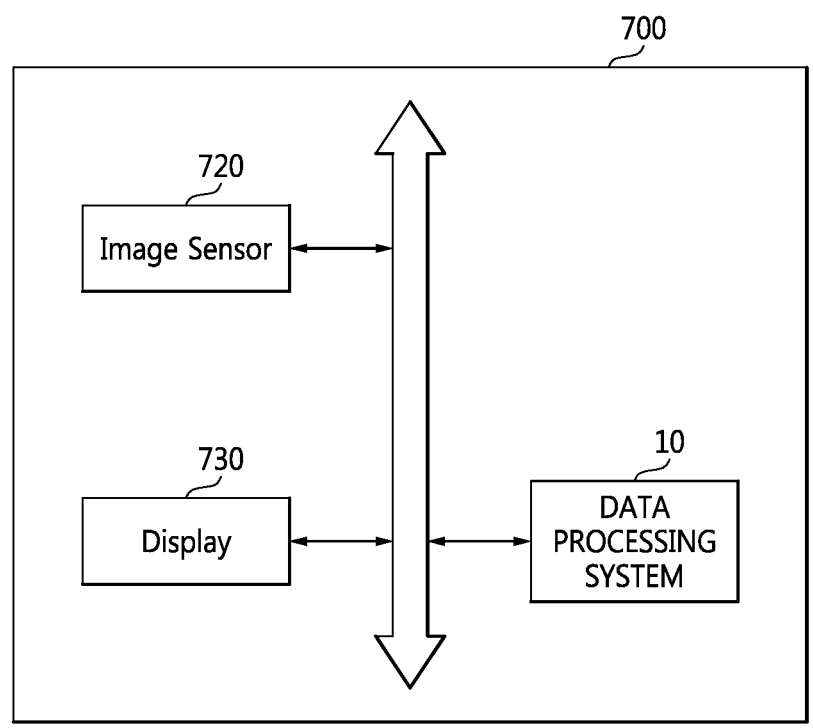
FIG. 16 is a block diagram of a system including a data processing system according to further embodiments.

FIG. 16 is a block diagram of a system 700 including the data processing system 10 according to further embodiments. Referring to FIGS. 1 through 10 and FIG. 16, the system 700 may be implemented as a digital camera or a mobile computing device equipped with a digital camera. The system 700 may include the data processing system 10 configured to control the overall operation of the system 700, an image sensor 720, and a display 730.

The image sensor 720 may be configured to convert an optical image into a digital signal. The digital signal may be stored in the storage device 220 or displayed on the display 730 according to the control of at least one of the masters 100-1 through 100-m included in the data processing system 10. A digital signal output from the storage device 220 may be displayed on the display 730 according to the control of at least one of the masters 100-1 through 100-m.

As described above, according to some embodiments, a bus master may be configured to transmit only segments or beats needed to be updated via a system bus, thereby increasing data transmission efficiency. Since only segments needed or mostly only segments needed to be updated are transmitted to a slave via the system bus, bus traffic of the system bus is decreased.

While embodiments have been particularly shown and described with reference to particular embodiments, it will be understood by those of ordinary skill in the art that various changes in forms and details may be made therein without departing from the spirit and scope as defined by the following claims.

What is claimed is:

1. A system, comprising:
a finite state machine (FSM) configured to:
receive and analyze dirty bits for data segments, each of the dirty bits indicating whether corresponding data segment being to be updated;
identify particular data segments from the data segments to be output in segments in response to the analysis of the dirty bits; and
output a first selection signal, a second selection signal and location information of each of the particular data segments in response to the analysis of the dirty bits;
a first multiplexer configured to output the particular data segments among the data segments in the segments to a bus in response to the first selection signal; and
a second multiplexer disposed between the FSM and the bus to output a dirty bit of each of the particular data segments to the bus in response to the second selection signal.

2. The system of claim 1,
wherein a unit of the segments is a beat defined in an advanced microcontroller bus architecture advanced extensible interface (AMBA® AXI) protocol specification.

3. The system of claim 1, wherein:
the data segments are divided into a plurality of groups;
the particular data segments are located in one of the plurality of groups; and
the location information indicates a location of the one of the plurality of groups in the segments.

4. The system of claim 3,
wherein the FSM is further configured to identify all data segments of one of the groups as the particular data segments if at least one of the dirty bits of the data segments of the one of the groups is set to dirty.

5. The system of claim 1,
wherein the location information indicates a place of each of the particular data segments within the data segments.

6. The system of claim 5,
wherein the FSM is further configured to identify non-adjacent data segments with dirty bits set to dirty within the data segments as the particular data segments when the dirty bits of data segments between the non-adjacent data segments are set to not dirty.

7. The system of claim 5,
wherein the FSM is further configured to identify a data segment of the data segments with a dirty bit set to not-dirty as one of the particular data segments if a number of data segments with dirty bits set to dirty remaining to be output to the bus is less than a number of data segments that each of the segments has.

8. The system of claim 1, further comprising a processor configured to output the data segments and dirty bits,
wherein when all of the dirty bits indicate that none of the data segments stored in a cache accessed by the processor are changed, the FSM is configured to generate the first selection signal to prohibit generation of the segments and not output the location information.

9. The system of claim 1, further comprising a processor configured to output the data segments and dirty bits, wherein when all of the dirty bits indicate that none of the data segments stored in a cache accessed by the processor are changed, the FSM is configured to generate the second selection signal to prohibit output of the dirty bits and not output the location information.

10. The system of claim 1,
wherein the FSM is further configured to output final segment information for a final segment of the segments.

11. A data processing system comprising:
a bus;
a slave connected to the bus; and
a master connected to the bus and configured to transmit data to the slave via the bus, the master comprising:
   a finite state machine (FSM) configured to:
      receive and analyze dirty bits for data segments of the data, each of the dirty bits indicating whether corresponding data segment being to be updated;
      identify particular data segments from the data segments to be output in segments in response to the analysis of the dirty bits; and
      output a first selection signal and location information of each of the particular data segments in response to the analysis of the dirty bits; and
   a first multiplexer disposed between the FSM and the bus to output the particular data segments among the data segments in the segments to the bus in response to the first selection signal,
wherein the slave comprises a storage device, and
wherein the slave receives the segments and writes the data to the storage device based on the segments.

12. The data processing system of claim 11,
wherein a unit of the segments is a beat defined in an advanced microcontroller bus architecture advanced extensible interface (AMBA® AXI) protocol specification.

13. The data processing system of claim 11, wherein:
the data segments are divided into a plurality of groups;
the particular data segments are located in one of the plurality of groups;
the location information indicates a location of the one of the plurality of groups-within the plurality of groups; and
the FSM is further configured to identify all data segments of the one of the plurality of groups as the particular data segments if at least one of the dirty bits of the data segments of the one of the plurality of groups is set to dirty.

14. The data processing system of claim 11, wherein:
the location information indicates a place of each of the particular data segments in a sequence of data segments within the data; and
the particular data segments are not adjacent within the data.

15. A system comprising:
a first multiplexer; and
a finite state machine (FSM) coupled to the first multiplexer and configured to cause the first multiplexer to output selectively particular data segments from a plurality of data segments to a bus in segments such that each segment includes at least one data segment having a dirty bit set to dirty, each of the dirty bits indicating whether corresponding data segment being to be updated,
wherein the FSM is further configured to output location information indicating a location of each of the segments, and
wherein a final output segment includes only data segments of which each has a dirty bit set to dirty.

16. The system of claim 15,
wherein the FSM is further configured to output final segment information indicating whether a current output segment is a final output segment.

* * * * *